US008915238B2

(12) United States Patent
Goeken (10) Patent No.: US 8,915,238 B2
(45) Date of Patent: Dec. 23, 2014

(54) PORTABLE COLLAPSIBLE COOKING GRILL (76) Inventor: Eric Goeken, Chicago, IL (US)

(*) Notice: Subject to any disclaimer, the term of this patent is extended or adjusted under 35 U.S.C. 154(b) by 77 days.

(21) Appl. No.: 13/301,730

(22) Filed: Nov. 21, 2011

(65) Prior Publication Data
US 2012/0125323 A1 May 24, 2012

Related U.S. Application Data (60) Provisional application No. 61/415,777, filed on Nov. 19, 2010, provisional application No. 61/511,049, filed on Jul. 23, 2011.

(51) Int. Cl.
F24C 1/16 (2006.01)
A47J 37/07 (2006.01)

(52) U.S. Cl.
CPC ...... A47J 37/0704 (2013.01); A47J 2037/0777 (2013.01); A47J 37/0713 (2013.01)
USPC ........................................ 126/9 R; 126/25 R (58) Field of Classification Search
CPC ................................... F24B 1/205; F24C 1/16
USPC .................................. 126/9 R, 25 R
See application file for complete search history.

(56) References Cited

U.S. PATENT DOCUMENTS

| 4,554,864 | A | * | 11/1985 | Smith et al. | 99/340 |
|---|---|---|---|---|---|
| 4,655,294 | A | * | 4/1987 | Turner, Jr. | 169/46 |
| 5,195,500 | A | * | 3/1993 | Lerner | 126/29 |
| 5,208,097 | A | * | 5/1993 | Honma et al. | 442/164 |
| 6,059,170 | A | * | 5/2000 | Giampapa | 229/103 |
| 6,755,188 | B2 | * | 6/2004 | Skidmore et al. | 126/25 R |
| 7,089,926 | B2 | * | 8/2006 | Woller | 126/25 R |
| 7,607,425 | B2 | * | 10/2009 | Knight | 126/9 R |
| 2004/0000303 | A1 | * | 1/2004 | Regen et al. | 126/25 R |
| 2006/0076003 | A1 | * | 4/2006 | Smolinsky et al. | 126/9 R |
| 2006/0219279 | A1 | * | 10/2006 | Kaufman | 135/20.1 |

* cited by examiner

Primary Examiner — Kenneth Rinehart
Assistant Examiner — Gajanan M Prabhu
(74) Attorney, Agent, or Firm — Richards Patent Law P.C.

(57) ABSTRACT

A portable grill includes: a cooking grate; a collapsible body surrounding the sides and bottom of the cooking grate and collapsible mesh basket when the grill is configured for cooking; a collapsible frame supporting the position of the body, cooking grate, and the mesh basket when the grill is configured for cooking; and a removable collapsible lid adapted to cooperate with the body to completely surround the cooking grate and mesh basket when the grill is configured for cooking, wherein the collapsible body and collapsible lid are formed primarily from a flexible high temperature resistant material.

12 Claims, 6 Drawing Sheets

PORTABLE COLLAPSIBLE COOKING GRILL

CROSS-REFERENCE TO RELATED APPLICATIONS

This application incorporates by reference and claims priority to U.S. Provisional Patent Application No. 61/415,777 filed Nov. 19, 2010 and U.S. Provisional Patent Application No. 61/511,049 filed Jul. 23, 2011.

BACKGROUND OF THE INVENTION

The present invention relates to a portable cooking grill. More specifically, the present invention relates to a high-temperature, heat and flame resistant, collapsible, portable, cooking grill.

Grilling is one of the more popular ways to prepare food. The term grilling typically refers to cooking food, which is supported on a metal grill, via the direct or indirect application of dry heat. The fuel for the heat source is most commonly gas or charcoal. Traditional grills include: a bowl for holding the fuel source; a grill grate for suspending the food above the activated fuel source, a lid which cooperates with the bowl to enclose the activated heat source and the food, a vent for allowing the inflow/outflow of air into the enclosed bowl. Charcoal grills may also include an ash catcher at the bottom of the bowl for collecting the ash created by the burning charcoal.

Grilling is usually done outdoors and grills are very commonly stored outdoors as well. Due to the structural and environmental demands placed on grills (e.g., supporting the fuel source, supporting the food, resisting flames and heat, etc.), grills are typically formed from porcelain-enameled or other ceramic materials or aluminum, steel or other metallic materials. As a result, grills are often large, bulky, heavy, cumbersome and difficult to transport.

Because grilling is often considered an outdoor activity, it is commonly associated with beaches, picnics, camping, tailgating, etc. While portable grills are available, they often sacrifice size for portability. Moreover, even at a reduced size, portable grills are often cumbersome and difficult to bring along on outdoor activities.

Accordingly, a need exists for a portable cooking grill that addresses the limitations of existing grills.

SUMMARY OF THE INVENTION

The present invention meets the needs expressed above by providing a high-temperature, heat and flame-resistant, collapsible, portable, fabric cooking grill. The fabric used is a high-temperature fabric, such as, for example, silicate fiber or fiberglass woven fabric with high temperature silicone coating. In some examples, the fabric may incorporate a reflective inner coating, such as, for example, an aluminum coating. In another example, the needs expressed above are met by substituting or supplementing the heat and flame-resistant fabric, with a high temperature, FDA approved silicone material.

An illustrative example of the grill includes a high-temperature fabric lid. The lid is structurally rigid in use, but may be rolled up for convenient storage and transportation when not in use. The lid includes a handle and a series of ventilation holes. The structural rigidity in the lid may be provided, for example, by thin sheet metal elements reinforcing the fabric. In addition, the vents may be reinforced by metal grommets or similar reinforcing material.

The grill further includes a metallic grill grate for supporting the food. The grill grate may be, for example, a folding grate or a grate that may roll up to be more easily stored and/or transported. Below the grill grate is a suspended charcoal basket. In some examples, the charcoal basket may be formed from a metal mesh or netting, which enables the basket to support the charcoal, allow the ash to fall through the basket, reduce the weight of the basket and allow the basket to be rolled or folded for storage and/or transportation.

The body of the grill is provided to coordinate with the lid to encapsulate the grill grate and charcoal basket. The body may be formed from the same material as the lid, or another high-temperature fabric. The body may include additional vent holes. The body itself may function as an ash catcher, particularly when the body is lined, coated or formed from a non-stick or other easy to clean material.

The structure of the grill is provided, at least in part, by a collapsible frame structure made from heat resistant structural material, such as, for example, metal, fiberglass, carbon fiber, etc. The frame may be hinged or jointed and provide attachment mechanisms for securing the frame to the body, supporting the basket and grate and providing a base upon which the lid may rest.

The combination of elements described herein provide a grill that cools quickly after use such that a user may disassemble and store the disassembled grill in a compact form shortly after grilling is completed.

In certain embodiments, the other elements of the grill may be stored and/or transported within the lid, which collapses to surround the remaining elements, clasps shut (with a clasp, tie, buckle or other closure mechanism), and provides a handle for carrying the portable grill.

In other embodiments, the grill is adapted for use with a portable propane fuel supply. For example, a flexible high temperature silicone tube with metal nipples may be provided for attachment to the fuel source. The metal nipples expel the gas to be ignited and are used to protect the high temperature tube and protective sleeve from direct contact with the flame. In addition, a high temperature silicate fiber or fiberglass or woven metal wire sleeve may be used to provide additional protection to the flexible silicone tubing. The flexible tube and protective sleeve may be designed to be able to withstand repeated exposure to high temperature environments.

A portable grill includes: a cooking grate; a collapsible body surrounding the sides and bottom of the cooking grate and collapsible mesh basket when the grill is configured for cooking; a collapsible frame supporting the position of the body, cooking grate, and the mesh basket when the grill is configured for cooking; and a removable collapsible lid adapted to cooperate with the body to completely surround the cooking grate and mesh basket when the grill is configured for cooking, wherein the collapsible body and collapsible lid are formed primarily from a flexible high temperature resistant material. In some embodiments, the flexible high temperature resistant material may be silicone or a silicone coated fabric.

The portable grill may further include a collapsible mesh basket adapted to hang beneath the cooking grate when the grill is configured for cooking. The lid may include a lid frame. The lid frame may be spring loaded to spring back into form after being collapsed. The lid frame may be formed from metal or other suitable structural materials. The cooking grate may also be foldable.

The body can be adapted to surround the collapsed mesh basket, collapsed frame, and collapsed lid for storage within the body. Alternatively, the lid can be adapted to surround the collapsed mesh basket, collapsed frame, and collapsed body for storage within the lid. In another version, the body and lid can be adapted to surround the collapsed mesh basket, and collapsed frame for storage within the body and lid combination. In some embodiments, the lid and body may collapse by flattening; similar to an accordion.

It is therefore an advantage of the portable grill in providing a lightweight grill that is easy to store and transport.

Further, it is an advantage of the portable grill in providing a grill that cools quickly after use, such that it may be collapsed for storage or transportation.

Still further, it is an advantage of the portable grill in providing a lightweight and easily transported grill.

In addition, it is an advantage of the grill lid provides a carrying case for the remaining elements of the grill.

It is a further advantage of the portable grill to be adaptable for use with a portable propane fuel source, for example, by providing a flexible, heat resistant tube for creating numerous flame sources from a single fuel source.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1:
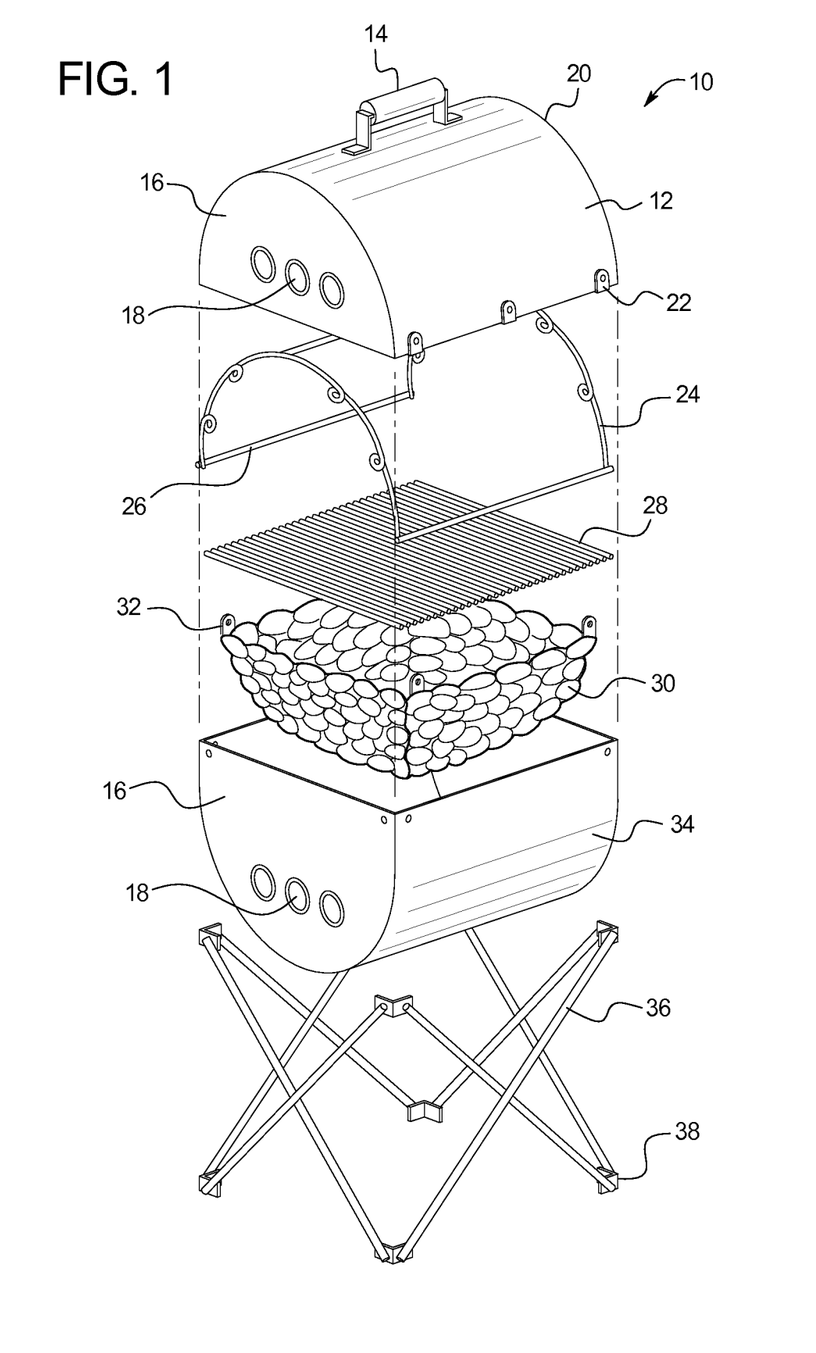
FIG. 1 is an exploded perspective view of a portable grill according to the present invention.

FIG. 1 illustrates an example of a portable collapsible cooking grill 10. As shown in FIG. 1, various elements may be assembled together to form the functional portable collapsible cooking grill 10. Examples of the various elements are described below with reference to the Figs.

As shown in FIG. 1, the grill 10 includes a top lid 12. The top lid 12 shown in FIG. 1 is formed from a high temperature resistant fabric covering 16. In the example in FIG. 1, this fabric covering 16 is composed of a silicate fiber material. Alternatively, the fabric covering 16 may be formed from fiberglass woven fabric coated with a high temperature resistant silicone. In both examples, the fabric covering 16 is able to withstand the temperatures desired or required to cook food within the grill 10. It is contemplated that the fabric covering 16 may be formed from any high temperature resistant fabric. Additionally, the fabric covering is flexible, relatively lightweight and can cool down quickly, which are benefits to the grill 10, as will be described further herein.

As shown in FIG. 1, the top lid 12 includes a lid handle 14. In the example shown in FIG. 1, the lid handle 14 is generally cylindrical in shape, and extends over the top lid 12, allowing a hand to grasp around the lid handle 14. It is advantageous to make the lid handle 14 from materials that provide some degree of insulation such that a user may grasp the lid handle 14 when the grill 10 is in use and/or shortly thereafter. It is contemplated that there may be any number of lid handles 14 in any configuration and location that may aid a user in operation, transportation and storage of the grill 10, as will be further described herein.

In FIG. 1, the top lid 12 also includes several ventilation holes 18 formed by holes in the fabric covering 16 surrounded by metal grommets. In use, these ventilation holes 18 provide ventilation through the top lid 12. The grommets may be formed from metal or any other structural material that can withstand the operating temperatures of the grill 10. In the example in FIG. 1, there are three ventilation holes 18 on either side of the top lid 12. However, it is contemplated that in other embodiments of the cooking grill 10, the top lid 12 may consist of any number of ventilation holes 18 or other elements located on the top lid 12 to provide ventilation.

Figure 3:
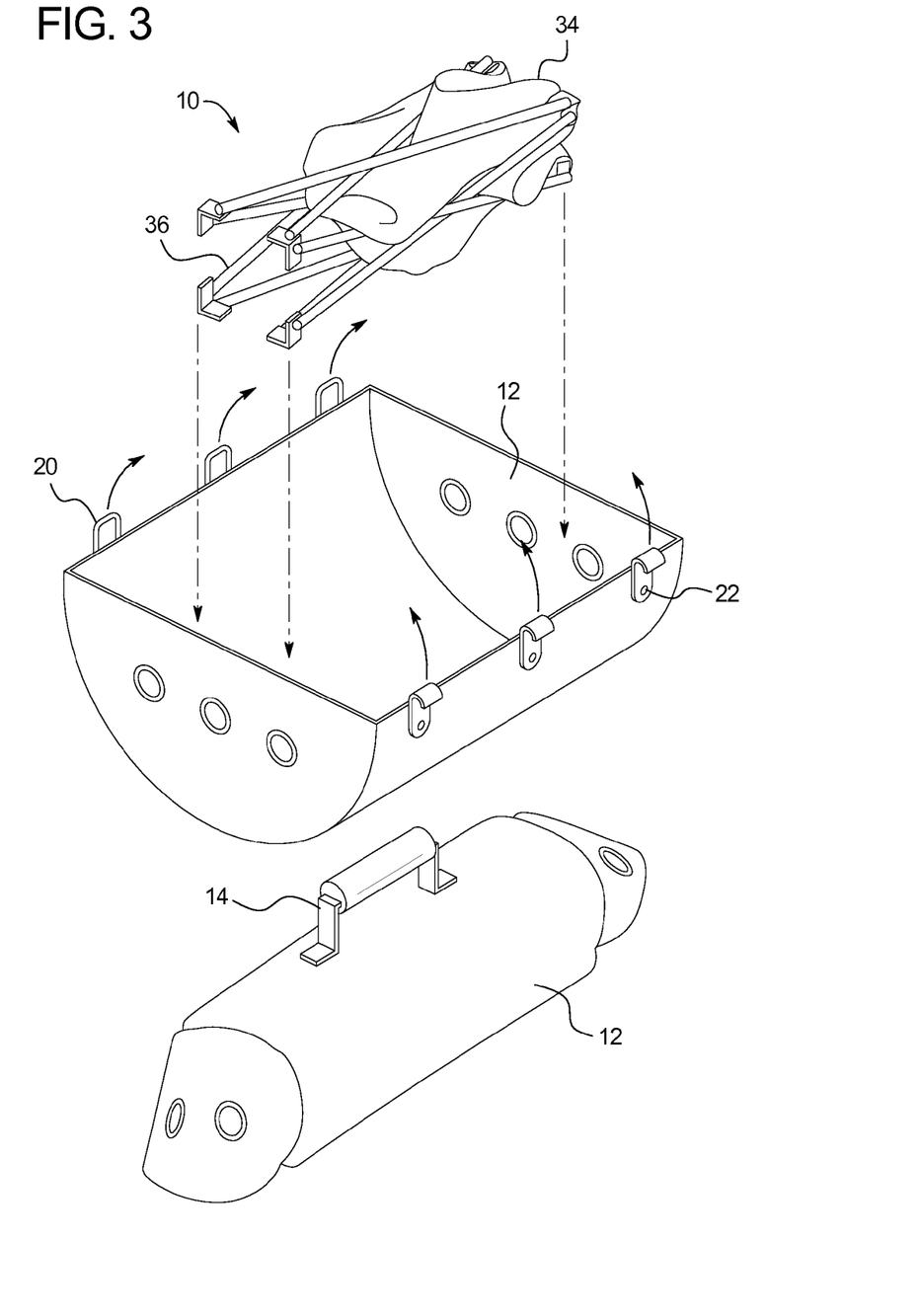
FIG. 3 is a perspective view of the lid of the portable grill shown in FIG. 1 configured to store the remaining elements of the portable grill for transportation.

As shown in FIGS. 1 and 3, the top lid 12 also contains a series of eyes 20 and hooks 22. As will be further described with reference to FIG. 3, the eyes 20 and hooks 22 allow the front and back edges of the top lid 12 to securely connect to each other for storage and transportation of the various elements of the grill 10. The eyes 20 and hooks 22 may be formed from a heat resistant material such as metal, fiberglass or carbon fiber or any other heat resistant material capable of providing the strength and durability required by the eyes 20 and hooks 22. In the example shown in FIG. 1, there are three pairs of eyes 20 and hooks 22. However, it is contemplated that in other embodiments of the cooking grill 10, the top lid 12 may include any number of eyes 20 and hooks 22 or other similar elements to provide releasable connection.

As further shown in FIG. 1, a lid frame 24 may be associated with the top lid 12 to provide form and structural rigidity thereto. The lid frame 24 may be sewn into the top lid 12, may be attached using fabric ties, may be slid into receiving channels in the top lid 12, etc. The lid frame 24 may be made from thin sheet metal, allowing the lid frame 24 to be rolled up for storage, while still providing structure and rigidity to the top lid 12. Alternatively, the lid frame 24 may be made from any material that will provide the requisite structure and rigidity while being heat resistant at the temperatures required for operation of the grill 10. In the example shown in FIG. 1, the lid frame 24 is spring-loaded enabling the lid frame 24 to spring back into place after being folded away. As further shown, the lid frame 24 includes a pair of rigid cross bars 26 connecting the left and right sides of the spring-loaded, foldable lid frame 24. However, it is understood that the example shown in FIG. 1 is merely one of numerous examples of lid frames 24 that may be adapted for use with a portable collapsible grill 10.

As further shown in FIG. 1, the cooking grill 10 includes a grate 28. The grate 28 supports the food above the heat source. In the example shown in FIG. 1, the grate 28 may be capable of being folded or rolled together for easy storage as the edges may be made from a heat-resistant fabric (such as the fabric used for the fabric covering 16). The spanning bars may be formed from aluminum or any fire resistant, non-toxic material. Alternatively, the grate 28 may be formed entirely from non-foldable metal, but include several hinges, enabling the grate 28 to fold up into a smaller structure. It is contemplated that the grate 28 can include any number or hinges or flexible parts allowing it to become more compact and that the grate 28 may be formed by any material that is appropriately heat-resistant, can be easily cleaned, and that is appropriate for direct contact with food.

As further shown in FIG. 1, the cooking grill 10 includes a suspended charcoal basket 30. The charcoal basket 30 may be a metal mesh or netting that will support the charcoal when preparing food. In the example shown in FIG. 1, the charcoal basket 30 is made up of a series of metal coils or mesh, thus allowing ash to fall through the charcoal basket 30. The charcoal basket 30 may be made from a material that is lightweight so as not to substantially add to the weight of the cooking grill 10. Also, the charcoal basket 30 may be easy to or fold or roll, thus making it very portable. It is contemplated that in other embodiments of the portable grill 10, the charcoal basket 30 may formed from other materials, as long as the charcoal basket 30 can be heat resistant, permeable, lightweight and portable.

As shown in FIG. 1, basket hooks 32 are provided at each corner of the charcoal basket 30. These basket hooks 32 allow the charcoal basket 30 to be suspended from the frame 36 of the grill 10 such that the charcoal basket 30 may be located underneath the grate 28. The basket hooks 32 shown in FIG. 1 are formed from a metal. However, it is contemplated that the basket hooks 32 may be formed from any structural material that can withstand the temperatures and stresses in use in the grill 10.

As further shown in FIG. 1, the cooking grill 10 contains a body 34 that is similar in composition and shape to the top lid 12. The body 34 also is constructed of the high-temperature fabric covering 16, and includes a series of ventilation holes 18. The body 34 coordinates with the top lid 12 to encapsulate the grate 28 and charcoal basket 30. In the example shown in FIG. 1, the fabric covering 16 may be coated with a non-stick and easy to clean coating, such as, for example, Teflon or silicon rubber. However, it is contemplated that the coating may be formed by any other material that is resistant to high temperatures, non-toxic, non-stick, and easy to clean. Additionally, the fabric covering 16 would have such properties making it impermeable to smoke. Such a non-stick coating may be applied to the entire fabric covering 16 on the top lid 12 and the body 34. However, in other embodiments it is contemplated that only portions of the fabric coating 16 may be coated with a non-stick material or that none of the fabric coating 16 may include a non-stick coating.

As further shown in FIG. 1, the cooking grill 10 includes a frame 36 capable of supporting the assembled cooking grill 10. In the example in FIG. 1, the segments on the frame 36 are jointed, or hinged, so as to allow them to fold when desired. Accordingly, the frame 36 is collapsible and may be folded up along with the body 34 and the charcoal basket 30, as shown in FIG. 3. The frame 36 maybe formed from a heat resistant material such as metal, fiberglass or carbon fiber. However, it is contemplated that the frame 36 may be formed by any heat-resistant material that is sturdy and can support the cooking grill 10.

As further shown in FIG. 1, at each top corner of the frame 36, is a frame attachment mechanism 38. These frame attachment mechanisms 38 may first connect to the body 34 and then may be secured the charcoal basket 30. The frame attachment mechanisms 38 allow the charcoal basket 30 to be removed easily so that the body 34 can be cleaned after cooking. The frame attachment mechanisms 38 may be adapted to further connect to the grate 28. The frame attachment mechanisms 38 are formed from a heat resistant material such as metal, fiberglass or carbon fiber. However, it is contemplated that the frame attachment mechanisms 38 may be formed by any heat resistant structural material. In the example shown in FIG. 1, there are eight frame attachment mechanisms 38 which may be used to secure the various elements of the cooking grill 10 to either side of the reversible frame 36. However, it is contemplated that in other embodiments there may be any number of frame attachment mechanisms 38 and they may or may not be located on both sides of the frame 36.

In the example shown in FIG. 1, the cooking grill 10 does not include a hole in the bottom of the body 34. However, it is contemplated that in alternative embodiments, there may be a hole in the bottom of the body 34, thus allowing ash from the charcoal to fall through the body 34 into a receptacle. In an alternative embodiment, it is contemplated that a tray may hang from the charcoal basket 30 and descends through the hole in the body 34 to catch the ashes.

Figure 2:
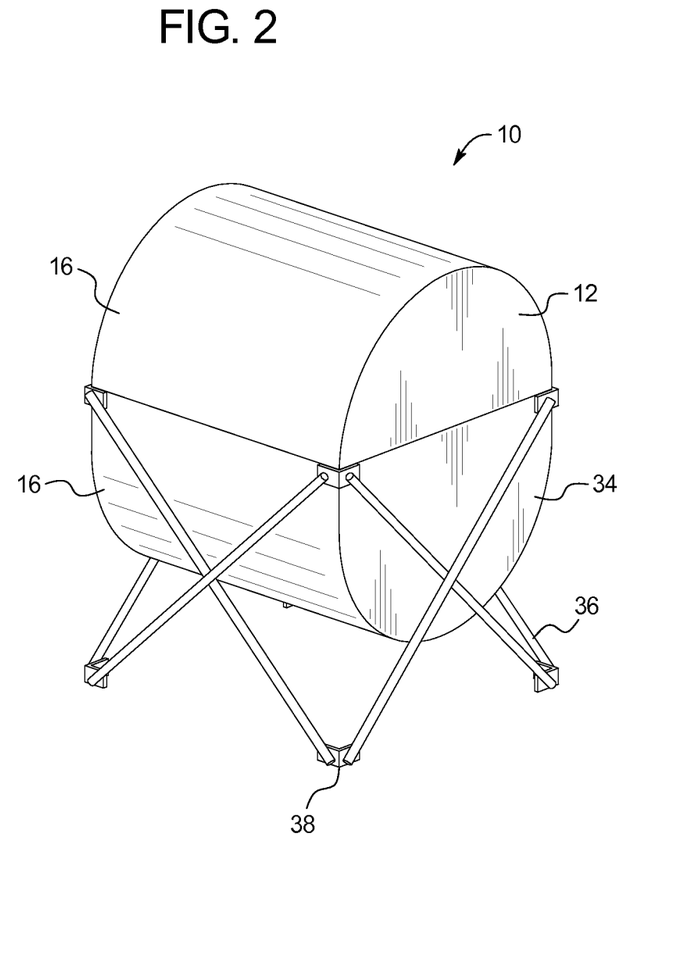
FIG. 2 is a perspective view of the portable grill shown in FIG. 1 in assembled form.

The example shown in FIG. 1 is an exploded perspective view of the cooking grill 10 showing all of the components in unassembled form. Turning now to FIG. 2, all the elements described in FIG. 1 combine to show the assembled cooking grill 10. The example in FIG. 2 demonstrates how the top lid 12 rests on the body 34 when the cooking grill 10 is closed. The fabric covering 16 covers the entire top lid 12 and the body 34. The body 34 sits inside of the frame 36, and stabilizes the cooking grill 10. The attachment mechanisms 38 are attached to the bottom and top of the structures of the frame 34, thus securing the cooking grill 10. In the example shown in FIG. 2, the cooking grill 10 is cylindrical in shape. However, it is contemplated that in other embodiments, the overall shape of the cooking grill 10 may be configured into other shapes or forms.

Turning now to FIG. 3, the illustrated example shows how in certain embodiments, the other elements of the grill 10 may be stored and/or transported within the top lid 12, which collapses to surround the remaining elements. As shown in FIG. 3, the body 34 folds up into the frame 36, making the body 34 and frame 36 much smaller than its expanded form. The body 34 and frame 36 may be placed into the top lid 12. Once the body 34 and frame 36 are inside the top lid 12, the ends will be closed together. Once the ends of the top lid 12 are closed together, the eyes 20 may be connected to the hooks 22. As shown in FIG. 3, the hooks 22 will hook into the eyes 20 thus securing the connection and enabling the folded top lid 12 and the various elements held within to be carried using the lid handle 14. In the example shown in FIG. 3, the clasps 22 have a flap that is inserted into the eyes 20. As shown in the bottom portion of FIG. 3, the end product of folding up the grill 10 is much small than its original form, thus making it easy to transport. Moreover, with appropriate material selection, the various elements of the grill 10 may cool relatively quickly after use and may be stored and transported much sooner than traditional grills. Of course, in other embodiments, the lid 12 and frame 36 may be stored within the body 34 or other arrangements may be provided wherein elements of the grill 10 may be stored and/or transported within another element.

Figure 4:
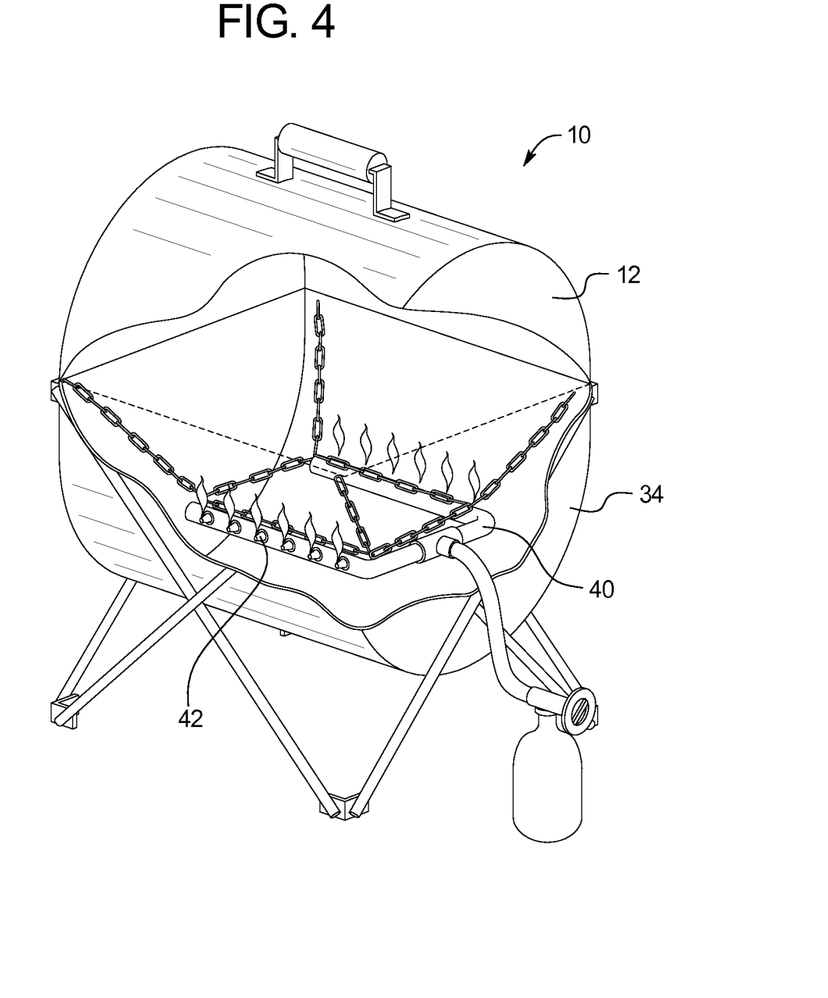
FIG. 4 is a perspective view of a flexible heat resistant fuel tube.

In the example shown in FIG. 1, the cooking grill 10 uses charcoal as a fuel source. However, it is contemplated that in alternative embodiments, there may be a propane source to create heat. Turning to FIG. 4, the cooking grill 10 is adapted for use with a portable propane fuel supply. In this example, there is a flexible high temperature tube 40 that may be provided for attachment to the fuel source. In the example in FIG. 4, the high temperature flexible tube 40 may be made out of silicone. However, it is contemplated that the tube 40 may be made out of any other material that can withstand repeated exposure to high temperatures.

Also, in FIG. 4, the tube 40 has a series of nipples 42 that expel gas to be ignited from the tube 40. In the example in FIG. 4, the nipples 42 may be composed of metal. However, it is contemplated that in other embodiments the metal nipples 42 may be composed of any material that will protect the tube 40 from the high temperatures and avoid direct contact with the flame. Also, in FIG. 4, there are six nipples 42 on each side of the tube 40. However, it is contemplated that in other embodiments of the cooking grill 10, the tube may consist of any number of nipples 42 or other elements adapted to protect the tube 40 from the high temperature environment.

In addition, a high temperature silicate fiber, fiberglass, or woven metal wire sleeve may be used to provide additional protection to the tube 40. However, it is contemplated that in alternative embodiments, there may not be a protective sleeve, or there may be a variation that would be designed to be able to withstand repeated exposure to high temperature environments. As further shown in the example in FIG. 4, the tube 40 may hang from each corner of the body 34 by a chain. However, it is contemplated that the tube 40 may be secured by other means. As further shown in FIG. 4, the tube 40 will connect to a portable propane tank outside of the cooking grill 10.

It is contemplated that when configured for use with gas fuel, the cooking grill 10 may include a flexible burner shield (not shown) may be located between the burners (e.g., nipples 42) and the grate 28 in order to protect the burners from dripping grease or other debris. The flexible burner shield may be formed from a network of interconnected metal disks (e.g., scale mail) or other flexible shields that are can withstand high temperatures and are capable of catching excess grease.

While not shown in the Figs., it is contemplated that the top lid 12 and body 34 may be connected via one or more hinges, providing a secure connection through which the position of the top lid 12 with respect to the body 34 may be adjusted by the user. The hinges may be spring loaded enabling the lid to spring open when desired. It is contemplated that the hinges may be two pieces, releasable from each other, with a piece connected to the body 34 and a cooperating piece connected to the top lid 12, which may quickly and easily be disassembled for storage and transportation and may be quickly and easily assembled for use.

Figure 5:
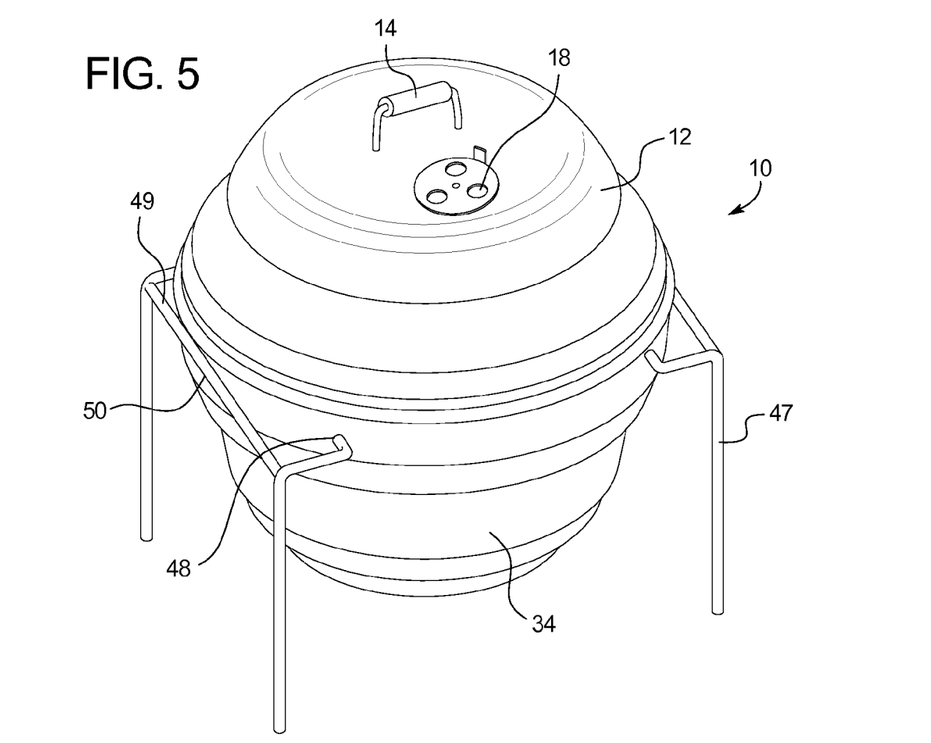
FIG. 5 is a perspective view of another portable grill in assembled and collapsed views.
Figure 6:
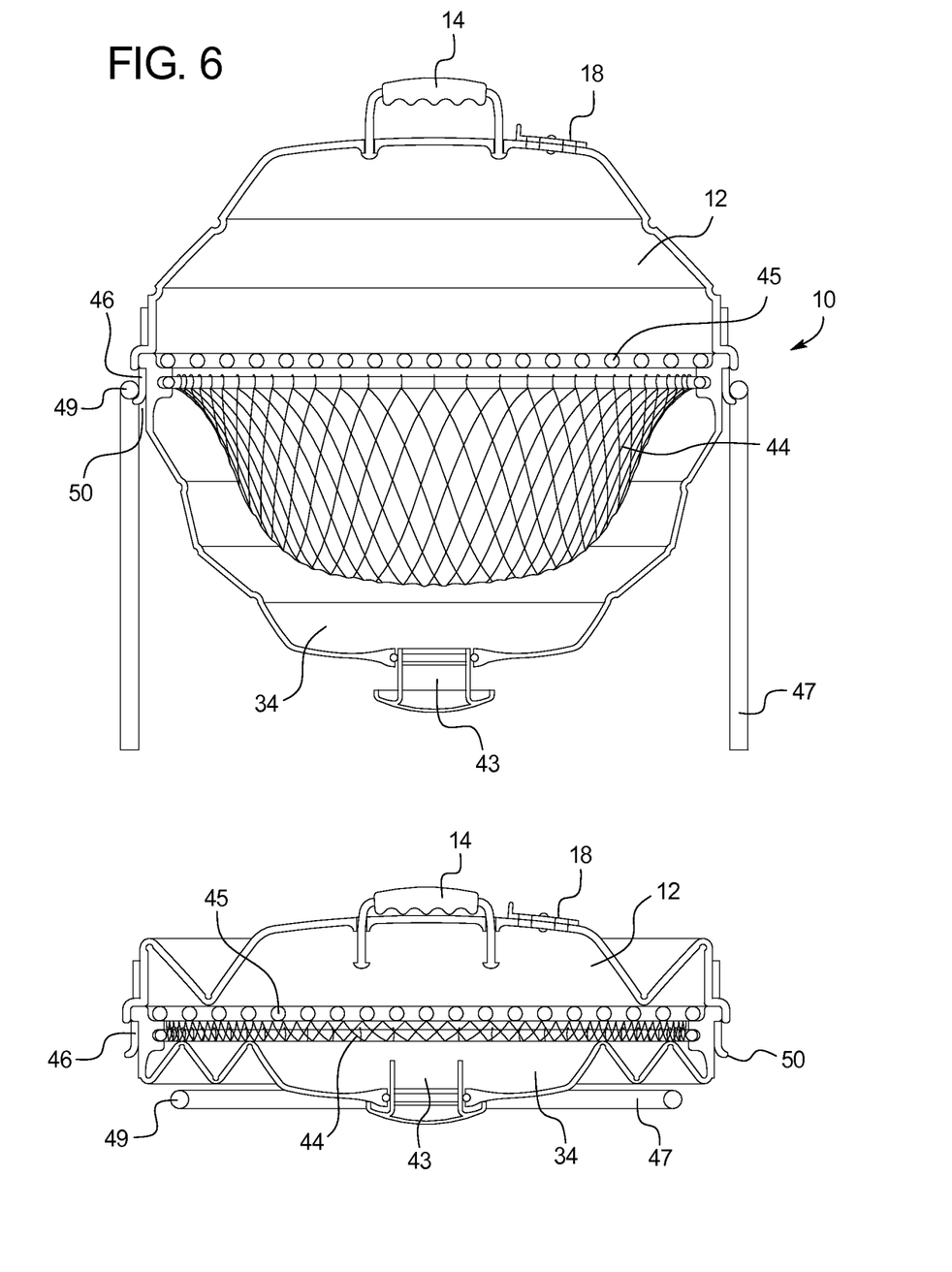
FIG. 6 is a cross-sectional view of the portable grill from FIG. 5 in assembled and collapsed views.

In still other embodiments the grill 10 may be different shapes and may employ different methods of collapsing. One example is illustrated in FIGS. 5 and 6. As shown in FIGS. 5 and 6, a high temperature FDA approved silicone may be used either alone or in conjunction with a high temperature fabric as a material for the lid 12 and body 34 of the grill 10. In this embodiment the grill 10 may be compacted by flattening the lid 12 and body 34.

As shown in FIG. 6, the silicone material folds in on itself in a telescoping fashion. In this embodiment, a folding cooking grate 28 is unnecessary and a more typical flat cooking grate 45 can be used, while still enabling the collapsed grill 10 to be substantially more compact than the fully assembled and operable configuration. As shown, a flat grate 45 may sit in the same location in both the collapsed and uncollapsed positions. A collapsible chain link wire basket 44 may be substituted for the chain mail coal basket 30 since in this version the basket need only be able to flatten out in order to be compacted.

In the example shown in FIGS. 5 and 6, the ventilation holes 18 are envisioned in a different orientation with a rotating metal plate provided to control how much smoke is able to escape the grill 10 thereby controlling how hot the fire may be. An ash catcher 43 is shown at the bottom of the grill 10 that can be opened or closed and allows air to feed the fire. The ash catcher 43 may further serve as a grease pan in a gas version of the grill 10.

An alternate version of the frame 36 is provided in the example shown in FIGS. 5 and 6. As shown, a metal or heat resistant rigid material forming a ring 46 is placed at the top of the body 34. Foldable legs 47 are then added to this ring 46 in order to prop the grill 10 off of the ground. Four holes 48 are punched into the structural ring 46 forming two axis about which the legs 47 may rotate. A structural cross bar 49 attaches two legs 47 together, allowing them to rotate in a pair. There is a lip 50 at the tangent point where the crossbar 49 meets the structural ring 46 when unfolded. This lip 50 allows the legs 47 to lock into the open position and stay there throughout the duration of the grill's 10 use. When appropriate pressure is applied, the legs 47 snap out of their open position and are able to be folded flat beneath the grill 10. Of course, it is understood that other methods of supporting the grill 10 may be implemented, as well as other shapes and methods of compacting the grill 10 itself.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A portable grill comprising:
    a cooking grate;
    a collapsible mesh basket;
    a collapsible body surrounding the sides and bottom of the cooking grate and collapsible mesh basket when the grill is configured for cooking, wherein the collapsible body includes a first perimeter;
    a collapsible frame supporting the position of the body, cooking grate, and the mesh basket when the grill is configured for cooking, wherein the collapsible frame has a first height when configured for cooking and a second height when configured for storage; and
    a removable collapsible lid adapted to cooperate with the body to completely surround the cooking grate and mesh basket when the grill is configured for cooking, wherein the collapsible lid includes a second perimeter, wherein the second perimeter directly contacts the first perimeter of the collapsible body to form a seal when the grill is configured for cooking, wherein the second perimeter includes front and back edges including closure mechanisms adapted to secure the front edge to the back edge to surround the collapsed mesh basket, collapsed frame, and collapsed body for storage within the lid when the grill is configured for storing, wherein the collapsible lid has a length parallel to the front edge and back edge, wherein the length is longer than second height of the collapsible frame, and wherein the collapsible body and collapsible lid are formed primarily from a flexible high temperature resistant material.

2. The portable grill of claim 1 wherein the flexible high temperature resistant material is a silicone coated fabric.

3. The portable grill of claim 1 wherein the flexible high temperature resistant material is silicone.

4. The portable grill of claim 1 wherein the lid and body collapse by flattening.

5. The portable grill of claim 1 wherein the lid includes a lid frame.

6. The portable grill of claim 5 wherein the lid frame is spring-loaded.

7. The portable grill of claim 6 wherein the lid frame is made from a metal.

8. The portable grill of claim 1 further comprising a collapsible mesh basket adapted to hang beneath the cooking grate when the grill is configured for cooking.

9. The portable grill of claim 1 wherein the cooking grate is foldable.

10. A portable grill comprising:
    a cooking grate;
    a collapsible mesh basket;
    a collapsible body surrounding the sides and bottom of the cooking grate and collapsible mesh basket when the grill is configured for cooking;
    a collapsible frame supporting the position of the body, cooking grate, and the mesh basket when the grill is configured for cooking, wherein the collapsible frame has a first height when configured for cooking and a second height when configured for storage; and
    a removable collapsible lid adapted to cooperate with the body to completely surround the cooking grate and mesh basket when the grill is configured for cooking, wherein the collapsible lid includes closure mechanisms adapted to secure a front edge to a back edge to surround the collapsed mesh basket, collapsed frame, and collapsed body for storage within the lid when the grill is configured for storing, wherein the collapsible lid has a length parallel to the front edge and back edge, wherein the length is longer than second height of the collapsible frame, and wherein the collapsible body and collapsible lid are formed primarily from a flexible high temperature resistant material.

11. The portable grill of claim 10 further wherein the collapsible body includes a first perimeter edge; and wherein the collapsible lid includes a second perimeter, wherein the second perimeter touches the first perimeter of the collapsible body to substantially form a seal when the grill is configured for cooking, wherein the second perimeter includes the front and back edges.

12. The portable grill of claim 11 further wherein the collapsible body substantially has a half-cylindrical shape when the grill is configured for cooking, and wherein the collapsible lid has a half-cylindrical shape when the grill is configured for cooking.

\* \* \* \* \*